(12) United States Patent
Rising, III et al.

(10) Patent No.: US 7,319,951 B2
(45) Date of Patent: Jan. 15, 2008

(54) APPLICATION OF CATEGORY THEORY AND COGNITIVE SCIENCE TO DESIGN OF SEMANTIC DESCRIPTIONS FOR CONTENT DATA

(75) Inventors: Hawley Rising, III, San Jose, CA (US); Ali Tabatabai, Cupertino, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 698 days.

(21) Appl. No.: 09/809,684

(22) Filed: Mar. 14, 2001

(65) Prior Publication Data

US 2001/0047254 A1 Nov. 29, 2001

Related U.S. Application Data

(60) Provisional application No. 60/191,312, filed on Mar. 21, 2000, provisional application No. 60/189,202, filed on Mar. 14, 2000, provisional application No. 60/189,626, filed on Mar. 14, 2000.

(51) Int. Cl.
*G06F 17/27* (2006.01)

(52) U.S. Cl. .................................. 704/9; 704/7; 704/1

(58) Field of Classification Search ............. 704/1–10; 707/2, 100; 709/245; 715/723; 382/284
See application file for complete search history.

(56) References Cited

U.S. PATENT DOCUMENTS

| | | | | |
|---|---|---|---|---|
| 5,197,005 | A * | 3/1993 | Shwartz et al. ................. | 707/2 |
| 6,199,068 | B1 * | 3/2001 | Carpenter .................... | 707/100 |
| 6,233,545 | B1 * | 5/2001 | Datig ............................. | 704/2 |
| 6,236,395 | B1 * | 5/2001 | Sezan et al. ................. | 715/723 |
| 6,240,406 | B1 * | 5/2001 | Tannen .......................... | 707/2 |
| 6,526,183 | B1 * | 2/2003 | Bonnet et al. .............. | 382/284 |
| 6,598,039 | B1 * | 7/2003 | Livowsky ....................... | 707/3 |
| 6,654,813 | B1 * | 11/2003 | Black et al. ................ | 709/245 |
| 2003/0191627 | A1 * | 10/2003 | Au .................................. | 704/9 |

OTHER PUBLICATIONS

Ikeda et al. ("Tron HMI Design Analysis by the Semiotic Approach", TRON Project International Symposium, 1993, IEEE, pp. 31-36).*

(Continued)

*Primary Examiner*—Richemond Dorvil
*Assistant Examiner*—Qi Han

(57) ABSTRACT

Instead of focusing on specific, static semantic description schemes, emphasis and focus is placed on determining what is necessary and needed to create any type or kind of semantic description for content data in various applications such as MPEG-7. In particular, numerous semantic description tools are selected after examining the principles of cognitive science and category theory. These semantic description tools provide sufficient flexibility and power to create any type or kind of semantic description. Semantic entity tools and categorical structure tools were identified as necessary and needed to create any type or kind of semantic description. Semantic entity tools are tools that represent entities in a semantic description. Categorical structure tools are tools that represent categorical structures of semantic entities and relations among these categorical structures. The semantic entity tools and the categorical structure tools facilitate creation of a semantic mosaic description for content data from multiple semantic descriptions.

33 Claims, 14 Drawing Sheets

OTHER PUBLICATIONS

Paek S. et al.: "Self-Describing Schemes for Interoperable MPEG-7 Multimedia Content Descriptions", Proceedings of the SPIE, SPIE, Bellingham, VA, US., vol. 3653, Jan. 1999, pp. 1518-1530, XP000863358, ISSN: 0277-786X, p. 1518, line 1-p. 1524, line 42.

Nack F. et al.: Der Kommende Standard Zur Beschreibung Mulitmedialer Inhalte MPEG-7, Fernmelde-Ingenieur, Bad Winsheim, De vol. 53, No. 3, Mar. 1999, pp. 1-40, XP0000997437 ISSN: 0015-010X, p. 11, line 7, p. 12, line 38, p. 19, line 1, p. 25, line 7, table 1.

Pereira, F: MPEG-7, A Standard For Describing Audiovisual Information: IEE Colloquium Multimedia Databases and MPEG-7, IEE, London GB, 1999, pp. 6-1, 6-6, XP000863277, p. 3, line 17, p. 4, line 25.

Nack F. et al.: "Everything You Wanted To Know About MPEG-7 Part 2" IEEE Multimedia, IEEE Computer Society, US, vol. 6, No. 4, Oct. 1999, pp. 64-73, XP000880605 ISSN: 1070-986X, p. 64, left-hand column, line 1, p. 67, left-hand column, line 25.

Hunter J.,: "MPET-7 Behind the Scenes" D-LIB Magazine, corp. for National Research Initiatives, Reston, VA, US, vol. 5, No. 9, Sep. 1999, pp. 1-7, XP002168491 ISSN 1082-9873,p. 1, line 24-line 35, p. 2, line 39, p. 5, line 19.

Nack F. et al.: "Everything You Wanted to Know About MPEG-7: Part 1" IEEE Multimedia, IEEE Computer Society, US, vol. 6, No. 3, Jul. 1999, pp. 65-77, XP000859976, ISSN: 1070-986X, p. 65, right-hand column line 25-line 50, p. 69, left-hand column, line-14, line 24, p. 73, left hand column, line 29, p. 74, right-hand column, line 46.

Hu M. J. et al.: "MD2L Content Description of Multimedia Documents for Efficient Process and Search/Retrieval" Proceedings of the Forum on Research and Technology Advances in Digital Libraries, ADL, XX, XX, May 19, 1999, pp. 200-213, XP000863289, p. 200, left-hand column, line 1 p. 202, right hand column, line 18.

"MPEG-7 Applications document v.7" ISO/IEC JTC1/SC29/WG11 MPEG 98/N2462, XX, XX, Oct. 1998, pp. 1-28, XP001004866 p. 1, p. 28.

* cited by examiner

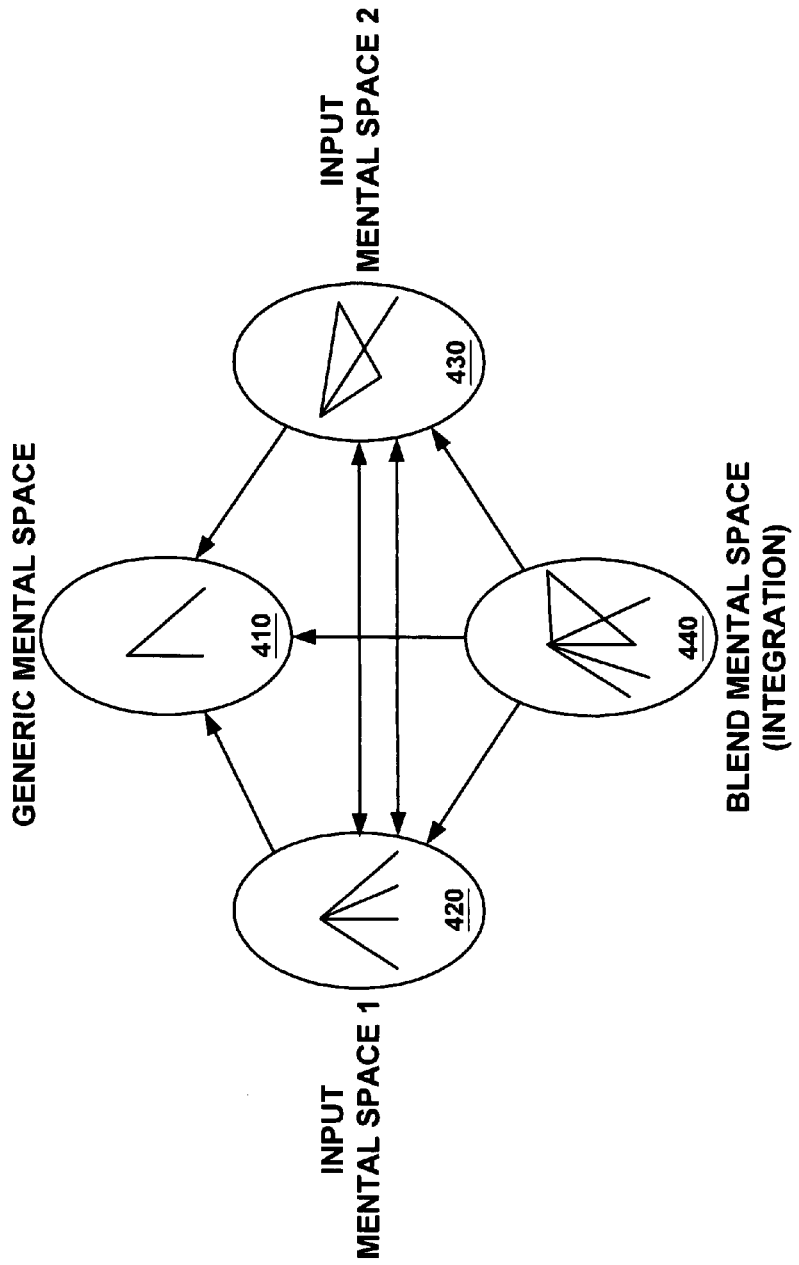

APPLICATION OF CATEGORY THEORY AND COGNITIVE SCIENCE TO DESIGN OF SEMANTIC DESCRIPTIONS FOR CONTENT DATA

RELATED U.S. APPLICATION

This patent application claims the benefit of U.S. Provisional Application No. 60/189,202, filed on Mar. 14, 2000, entitled "Report On The Importance Of Structure In Semantic Descriptions", by Hawley K. Rising III, and Ali Tabatabai. This patent application claims the benefit of U.S. Provisional Application No. 60/189,626, filed on Mar. 14, 2000, entitled "Contribution On The Distribution Of Semantic Information", by Hawley K. Rising III, and Ali Tabatabai. This patent application claims the benefit of U.S. Provisional Application No. 60/191,312, filed on Mar. 21, 2000, entitled "Report On The Importance Of Structure In Semantic Descriptions Using Semantic Mosaics", by Hawley K. Rising III, and Ali Tabatabai.

BACKGROUND OF THE INVENTION

1. Field of the Invention

The present invention generally relates to the field of semantic descriptions for content data. More particularly, the present invention relates to the field of methods and systems for implementing powerful and flexible semantic description tools to describe the underlying meaning of the content data.

2. Related Art

The MPEG-7 "Multimedia Content Description Interface" standard which is being developed by the Moving Pictures Expert Group (MPEG) focuses, unlike the preceding MPEG standards (e.g., MPEG-1, MPEG-2, and MPEG-4), on representing information about the content data, not the content data itself. The goal of the MPEG-7 standard is to provide a rich set of standardized tools to describe content data. In particular, MPEG-7 seeks to provide a simple, flexible, interoperable solution to the problems of indexing, searching, and retrieving content data. More specifically, MPEG-7 aims to standardize a core set of Descriptors that can be used to describe the various features of the content data; pre-defined structures of Descriptors and their relationships, called Description Schemes; a language to define Description Schemes and Descriptors, called the Description Definition Language (DDL); and coded representations of descriptions to enable efficient storage and fast access. The DDL is being based on XML Schema. Moreover, the MPEG-7 descriptions (a set of instantiated Description Schemes) are linked to the content data itself to allow fast and efficient searching for material of a user's interest.

Continuing, MPEG-7 intends to describe content data regardless of storage, coding, display, transmission, medium, or technology. MPEG-7 addresses a wide variety of media types including: still pictures, graphics, 3D models, audio, speech, video, and any combination thereof (e.g., multimedia presentations, scenarios, etc.). Examples of content data within the MPEG-7 standard include an MPEG-4 data stream; a video tape; a CD containing music, sound, or speech; a picture printed on paper, and an interactive multimedia installation on the Web (i.e., the Internet).

The MPEG-7 standard includes different types of Descriptors and Description Schemes. Some Descriptors and Description Schemes describe what is in the content data in terms of syntactic structure, color histogram, shape of an object, texture, motion, pitch, rhythm, etc.

On the other hand, semantic Description Schemes describe the underlying meaning or understanding of the content data. In particular, a goal, advertisement, and Madonna are examples of a semantic description (an instantiated semantic Description Scheme). Other examples of semantic descriptions includes a storyline for a movie (i.e., content data), a description of a scene in the movie, a description of an image, a description of a piece of music, etc.

Again, the semantic description is based on the underlying meaning of the content data. Typically, the semantic description is expressed with words. Unfortunately, computer systems or other computational systems are not able to usefully manipulate (e.g., create, exchange, retrieve, etc.) semantic descriptions expressed with only words. However, if structure is incorporated into the semantic descriptions, a computer system or other computational system can usefully manipulate semantic descriptions having structure. For example, it is not sufficient to describe the movie Zorro as having the entities Zorro, Zorro's girlfriend, a bad guy, a first sword fight, a second sword fight, etc. Relationships between these entities are needed, hence providing the structure.

Numerous proposals have been made to limit the types of structure to be incorporated into the semantic descriptions of the MPEG-7 standard. In particular, these proposals advocate creating specific, static semantic description schemes having only certain types of structure. Moreover, these proposals further encourage setting-up and running experiments to verify these specific, static semantic description schemes.

There are several problems with these proposals. First, these experiments can conclude that these specific, static semantic description schemes function well during these experiments because of the conditions of the experiments. Yet, these specific, static semantic description schemes can still fail when applied to new descriptive situations. For example, if these specific, static semantic description schemes can be applied to describe a soccer game, there is no way of knowing whether these specific, static semantic description schemes can be applied to describe a human birth. Secondly, these experiments do not indicate or help to determine the range of semantic descriptions that are impossible to implement or no longer capable of being implemented with these specific, static semantic description schemes because of the limitation on the types of structure incorporated.

SUMMARY OF THE INVENTION

Instead of focusing on specific, static semantic description schemes, emphasis and focus is placed on determining what is necessary and needed to create any type or kind of semantic description for content data in various applications such as MPEG-7. In particular, numerous semantic description tools are selected. These semantic description tools provide sufficient flexibility and power to create any type or kind of semantic description. Numerous semantic entity tools and numerous categorical structure tools were identified as necessary and needed to create any type or kind of semantic description. Semantic entity tools are tools that represent entities in a semantic description. Categorical structure tools are tools that represent categorical structures of semantic entities and relations among these categorical structures.

The process of developing semantic descriptions was analyzed using principles from cognitive science. This analysis showed that the process of developing semantic descriptions typically did not involve transferring or communicating entire semantic descriptions from one person to another person. Instead, each person developed his/her own semantic description based on prior experiences which were recalled, modified, combined, and extracted in various ways. From this observation, it was determined that semantic entity tools which had operational properties resembling these cognitive operations were needed to create any type or kind of semantic description.

Moreover, the principles of category theory were examined to determine whether categorical structures (structures observing the principles of category theory) could provide sufficient flexible structure to create any type or kind of semantic description. This examination revealed that the semantic entity tools could be mapped onto categorical structures such as a graph. Hence, categorical structure tools such a category, a graph, a functor, and a natural transformation were needed to create any type or kind of semantic description.

In another embodiment of the present invention, the semantic entity tools and the categorical structure tools facilitate creation of a semantic mosaic description for content data. The semantic mosaic description is formed from multiple semantic descriptions. These semantic descriptions are integrated with each other such that each semantic description is modified at a local level within localized regions without substantially changing each semantic description outside these localized regions. In particular, the semantic mosaic description facilitates navigation or browsing through the multiple semantic descriptions and the content data.

In yet another embodiment of the present invention, the semantic entity tools and the categorical structure tools facilitate creation of a semantic description for content data using multiple component semantic descriptions stored remotely from the content data. Reference information is associated with the content-data, whereas the reference information includes the identity of the component semantic descriptions needed to form the semantic description, the location of these component semantic descriptions, and the manner of processing these component semantic descriptions to form the semantic description. When the semantic description is desired, the component semantic descriptions identified in the reference information are retrieved (e.g., from a location on a network, a control dictionary, etc.). Then, the semantic description is formed in the manner specified in the reference information using the component semantic descriptions. Thus, the semantic description does not have to be stored in a discrete location, saving storage resources and promoting re-use of component semantic descriptions.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 4 illustrates numerous mental spaces in accordance with an embodiment of the present invention, showing creation of a blend mental space by integrating or blending input mental space1 and input mental space2.

Figure 1:
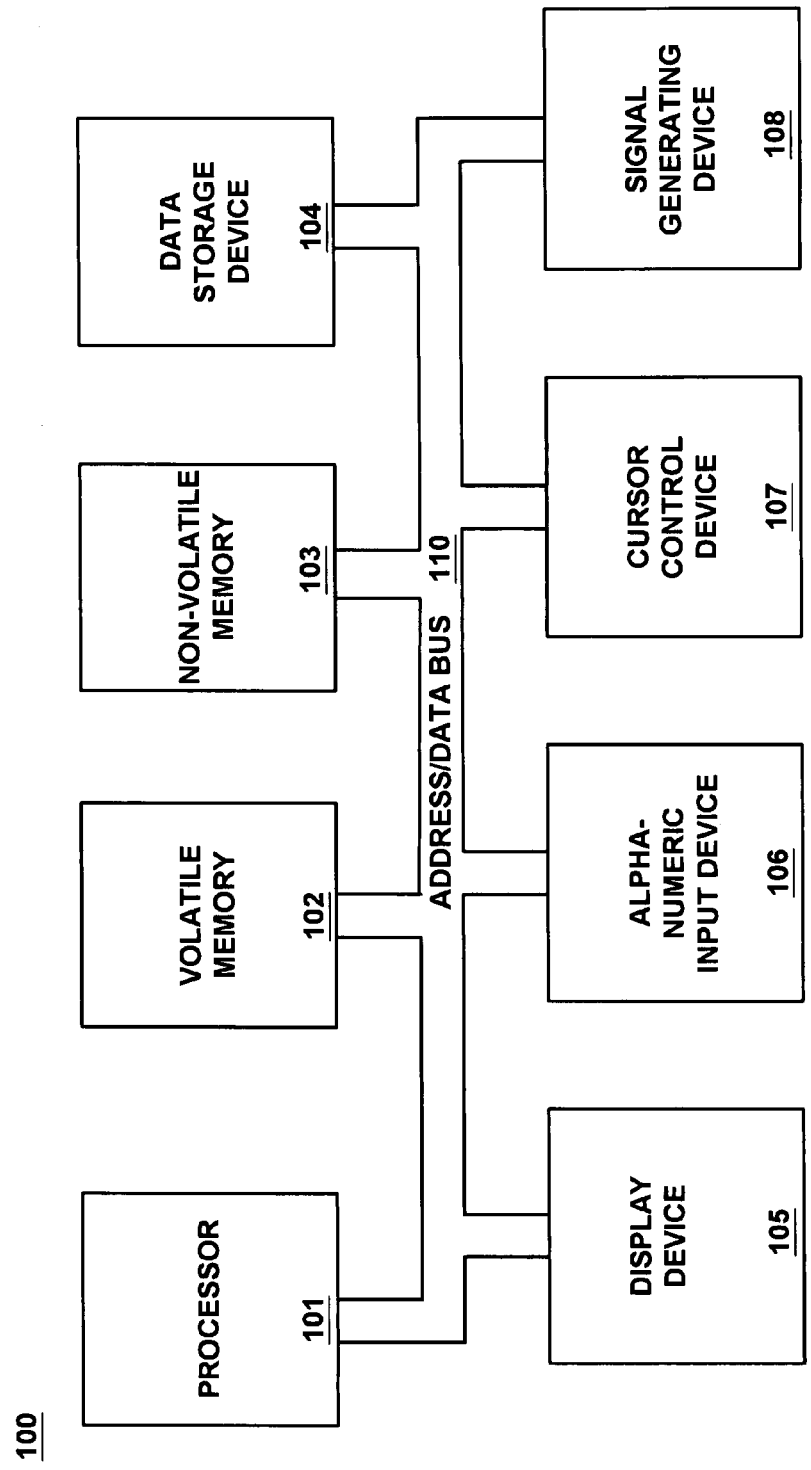
FIG. 1 illustrates an exemplary computer system in which the present invention can be practiced.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, a variety of terms are discussed that refer to the actions and processes of an electronic system or a computer system, or other electronic computing device/system. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical, mechanical, or quantum computers.

Exemplary Computer System Environment

Aspects of the present invention are discussed in terms of steps executed on a computer system or any other computational system. Although a variety of different computer systems can be used with the present invention, an exemplary computer system 100 is shown in FIG. 1.

With reference to FIG. 1, portions of the present invention are comprised of computer-readable and computer executable instructions which reside, for example, in computer-usable media of an electronic system such as the exemplary computer system. FIG. 1 illustrates an exemplary computer system 100 on which embodiments of the present invention may be practiced. It is appreciated that the computer system 100 of FIG. 1 is exemplary only and that the present invention can operate within a number of different computer systems including general-purpose computer systems and embedded computer systems.

Computer system 100 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Exemplary computer system 100 also includes a data storage device 104 ("disk subsystem") such as a magnetic or optical disk and disk drive coupled with the bus 110 for storing information and instructions. Data storage device 104 can include one or more removable magnetic or optical storage media (e.g., diskettes, tapes) which are computer readable memories. Memory units of computer system 100 include volatile memory 102, non-volatile memory 103 and data storage device 104.

Exemplary computer system 100 can further include an optional signal generating device 108 (e.g., a network interface card "NIC") coupled to the bus 110 for interfacing with other computer systems. Also included in exemplary computer system 100 of FIG. 1 is an optional alphanumeric input device 106 including alphanumeric and function keys coupled to the bus 110 for communicating information and command selections to the central processor 101. Exemplary computer system 100 also includes an optional cursor control or directing device 107 coupled to the bus 110 for communicating user input information and command selections to the central processor 101. An optional display device 105 can also be coupled to the bus 110 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two-dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

Category Theory and Cognitive Science in the Design of Semantic Descriptions for Content Data The present invention is applicable to the MPEG-7 standard or to any other application which uses semantic descriptions.

Figure 2:
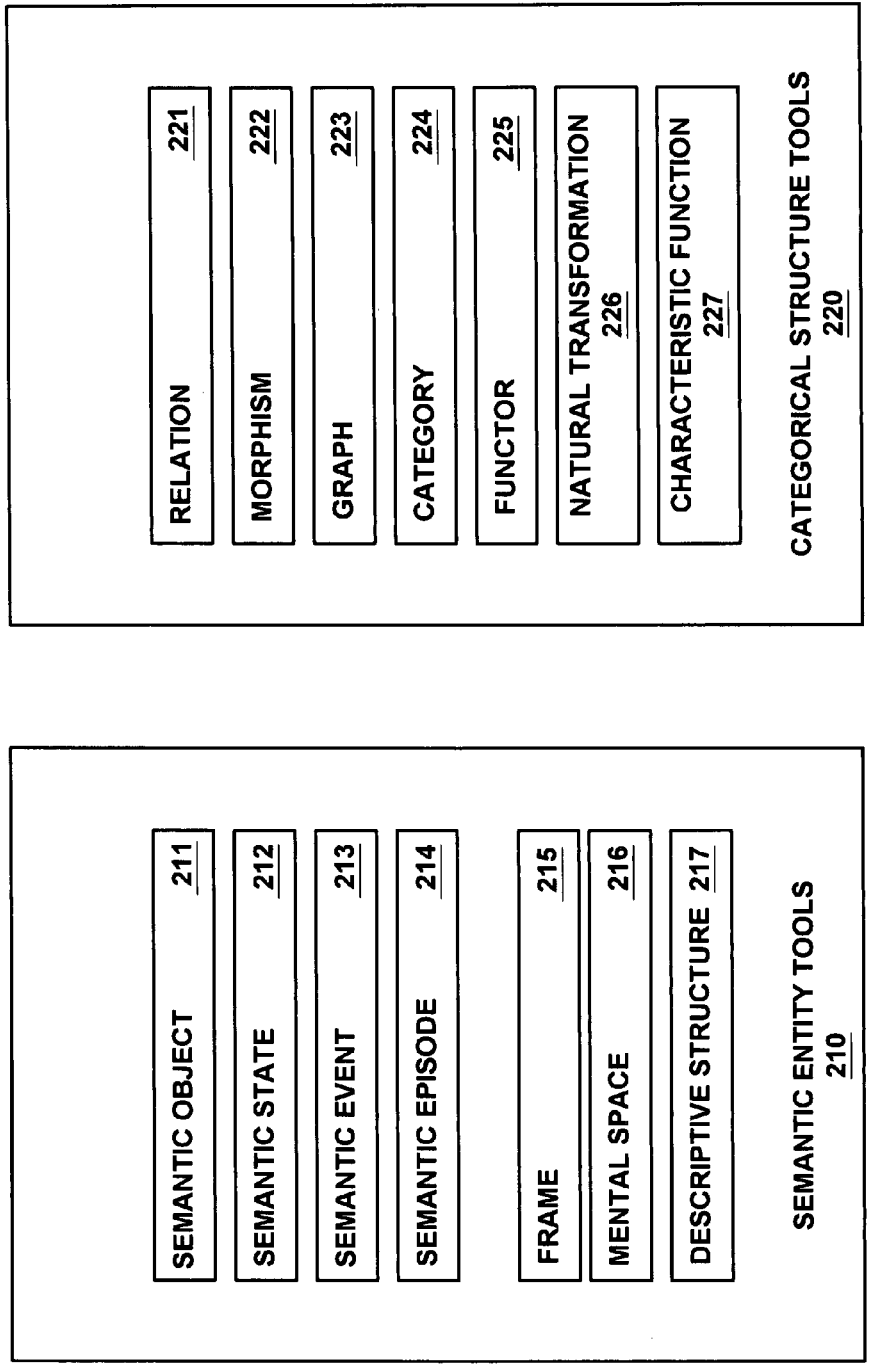
FIG. 2 illustrates semantic entity tools and categorical structure tools in accordance with an embodiment of the present invention.

FIG. 2 illustrates semantic entity tools 210 and categorical structure tools 220 in accordance with an embodiment of the present invention. Instead of focusing on specific, static semantic description schemes, emphasis and focus is placed on determining what is necessary and needed to create any type or kind of semantic description for content data in various applications such as MPEG-7. In particular, numerous semantic description tools 210 and 220 are selected. These semantic description tools 210 and 220 provide sufficient flexibility and power to create any type or kind of semantic description. Numerous semantic entity tools 211-217 and numerous categorical structure tools 221-227 were identified as necessary and needed to create any type or kind of semantic description. Semantic entity tools 211-217 are tools that represent entities in a semantic description. Categorical structure tools 221-227 are tools that represent categorical structures of semantic entities 211-217 and relations among these categorical structures. In an embodiment, the semantic entity tools 211-217 and the categorical structure tools 221-227 are implemented as Description Schemes.

The semantic entity tools 210 include core semantic entities (e.g., 211-214), constructed semantic entities (e.g., 216-217), and a context semantic entity (e.g., 215). A semantic object 211, a semantic state 212, a semantic event 213, and a semantic episode 214 are core semantic entities. A frame 215 is a context semantic entity. Moreover, a mental space 216 and a descriptive structure 217 are constructed semantic entities. In an embodiment, each constructed semantic entity can include a core semantic entity (e.g., 211-214), a context semantic entity (e.g., 215), and relationships among these.

The categorical structure tools 220 include a relation 221, a morphism 222, a graph 223, a category 224, a functor 225, a natural transformation 226, and a characteristic function 227.

Referring again to FIG. 2, a semantic object or object 211 in a semantic description is derived from a physical object or an abstraction of the physical object. In particular, the semantic object 211 describes a physical or abstract object semantically. Physical objects have spatial contiguity, and temporal duration. Physical objects are described in various ways. Moreover, the change in a semantic object 211 over time, or the particular circumstances, or type of a generic semantic object 211, are described with reference to attributes, which are qualities of the semantic object 211. The collection of these qualities changes over time, and can be called the semantic state or state 212 of the semantic object 211. Thus, semantic objects 211 have semantic states 212.

Physical objects are frequently divisible. The subsets of the material of a physical object can be physical objects in their own right. These subsets can be referred as physical subobjects. Thus, semantic objects 211 can have semantic subobjects. The collection of semantic subobjects of a given semantic object 211, or the collection of semantic subobjects of a collection of semantic objects 211, admits a partial order, by inclusion.

Likewise, since semantic states 212 are frequently complex, containing more than a single attribute, they can have subcollections. These subcollections can be semantic states 212 if these subcollections have semantic meaning. Thus, semantic states 212 can have semantic substates.

A change in semantic state 212 is a semantic event or event 213. Since, as was remarked above, semantic states 212 are complex, a semantic event 213 may likewise be complex, since the semantic event 213 may indicate the change in a large number of attributes. Consequently, if such a set of attributes admits a subset with semantic meaning, and that subset can change independently from the rest, a semantic event 213 can have semantic subevents.

Thus, a semantic description formed with a semantic object 211 may or may not describe semantic subobjects, semantic states 212, semantic substates, semantic events 213, or semantic subevents. More importantly, the semantic description may contain relationships other than inclusion of parts.

A semantic episode or episode 214 denotes an inclusive semantic description of what transpires over a period of time, from some (possibly implied) starting time to (also possibly implied) ending time, with a duration greater than zero. A semantic episode 214 can be a temporal designation with semantic meaning. If there are time periods of shorter duration between the start of the semantic episode 214 and the end of the semantic episode 214, which have semantic meaning, these may be called semantic subepisodes.

The semantic description includes relationships. One relationship that has already been seen and holds for all of the above identified semantic entities 211-214 is that of inclusion, in the manner of a semantic subobject, semantic subevent, semantic subepisode, or semantic substate. The lists of relationships between such semantic entities 211-214 can be quite long. The formal definitions of two mathematical concepts, which will facilitate them, are the definition of a relation 221 and the definition of a morphism or mapping 222, which are illustrated in FIG. 2.

A relation on a group of mathematical objects is a subset of the formal Cartesian product of the mathematical objects. For instance, a binary relation is a subset of the set of ordered pairs of mathematical objects. A partial order is a subset such that if (a,b) and (b,c) are in the set, so is (a,c), and if (a,b) and (b,a) are in the set then a=b. Inclusion is a partial order. Moreover, containment is a partial order (i.e., when one mathematical object is contained in another). Containment and inclusion are not the same: One would hardly say that a fish is part of a fish tank, but it is likely to be found there.

A morphism or mapping 222 is an assignment consisting of ordered pairs from a set called the domain and a set called the codomain. It can have more distinction than that, for instance, a function is a mapping where the codomain is the real (or complex) numbers, and for each element a of the domain, there is exactly one element b of the codomain.

Thus, a relationship between mathematical objects is either a relation 221 or a morphism/mapping 222. Since relations 221 can be expressed as compositions of mappings, (a and b map to (a,b) which maps via the characteristic function 227 of the subset mentioned above to either true or false. A generalization of the characteristic function 227 maps to a discrete set, and is called a subobject classifier.), a relationship is a morphism or mapping 222. There are several kinds of relationships. Inclusion was mentioned above. Moreover, containment, similarity, example of, and relative position are also relationships.

Since inclusion is a relationship on all of the categories of semantic entities 211-214 identified above, semantic objects 211, semantic events 212, semantic states 213, and semantic episodes 214 can all have relationships. It is also possible to have relationships between these semantic entities 211-214, the most obvious being between semantic objects 211, semantic events 213, and semantic states 212, but semantic episodes 214 may sometimes be effectively described by relationships as well. As noted above, semantic events 213 are described as a change in semantic state 212, a semantic state 212 being a collection of attributes for a semantic object 211. Furthermore, a relationship is a morphism or mapping 221. Mappings may be parametrized. Thus, a change in the parameters of a mapping between two of the above identified semantic entities 211-214 fits well as a semantic event 213. In fact, it is possible for semantic entities 211-214 of the above categories to be described by a complex set of mappings. This set is also a relationship. A change in the relationship between members of the above identified semantic entities 211-214 is a semantic event 213. That change may as easily be a change in the mapping that describes the relationship, as a change in the parameters of that mapping (It is possible to write this all in a way that makes every semantic event 213 a change in parameters, by using a function space and indexing it over an appropriate parameter set).

The process of developing semantic descriptions was analyzed using principles from cognitive science such as "input mental spaces", mappings between "mental spaces", and "blend mental spaces". Cognitive science provides schemes for interpreting semantic content in language. The understanding of "mental spaces" and their mappings is apropos to creation of semantic descriptions for content data. In particular, mappings, precedences, and contexts that really imbue semantic descriptions with meaning depend on the rules governing perception and interpretation. This can be described by a "mental space", mappings between "mental spaces", and integration of part or all of a set of "mental spaces" into a new "mental space". The interpretation of speech, which is, after all, the prototype for semantic description of content data, requires the construction of a set of "mental spaces" which provide context for the communication. These "mental spaces" are built by importing a lot of information not included in the speech, wherein the importing of information is interpreted as semantic description. The maps by which this is done include recruiting "frames", which are predefined constructs for interpretation, projecting structure from one semantic description to another, and integrating or abstracting imported material from more than one other semantic description. This process is not limited to descriptive speech per se.

Each "mental space", then, is an extended description containing entities, relationships, and frames, and several "mental spaces" may be active at once, in order to properly define all the entities in the semantic description. These "mental spaces" enter into relationships with each other. Since these "mental spaces" borrow structure and entities from each other, there are mappings necessarily between such "mental spaces". The whole composite forms a backdrop to the expressed description, and completes the process of attaching semantic meaning to the entities involved in the speech.

This analysis shows that the process of developing semantic descriptions typically does not involve transferring or communicating entire semantic descriptions from one person to another person. Instead, each person develops his/her own semantic description based on prior experiences which are recalled, modified, combined, extracted, and mapped in various ways. From this observation, it was determined that semantic entity tools which had operational properties resembling these cognitive operations were needed to create any type or kind of semantic description. As illustrated in FIG. 2, the mental space 216, the descriptive structure 217, and the frame 215 are semantic entity tools originating from cognitive concepts. Frames 215 are preassumed or predefined sets of rules for interpreting or describing a set of semantic objects 211. As such, frames 215 may be prototypical semantic descriptions themselves, or they may be sets of rules, definitions, and descriptive structures. Descriptive structures 217 are abstractions of semantic objects 211, semantic episodes 214, semantic states 212, and relationships (which are either relations 221 or morphisms/mappings 222 as described above) to graphs 223, with or without extra properties. Mental spaces 216 are collections of semantic objects 211, relationships (which are either relations 221 or morphisms/mappings 222 as described above), and frames 215, together with mappings which embed descriptive structures 217 from semantic descriptions or from other mental spaces.

Figure 3:
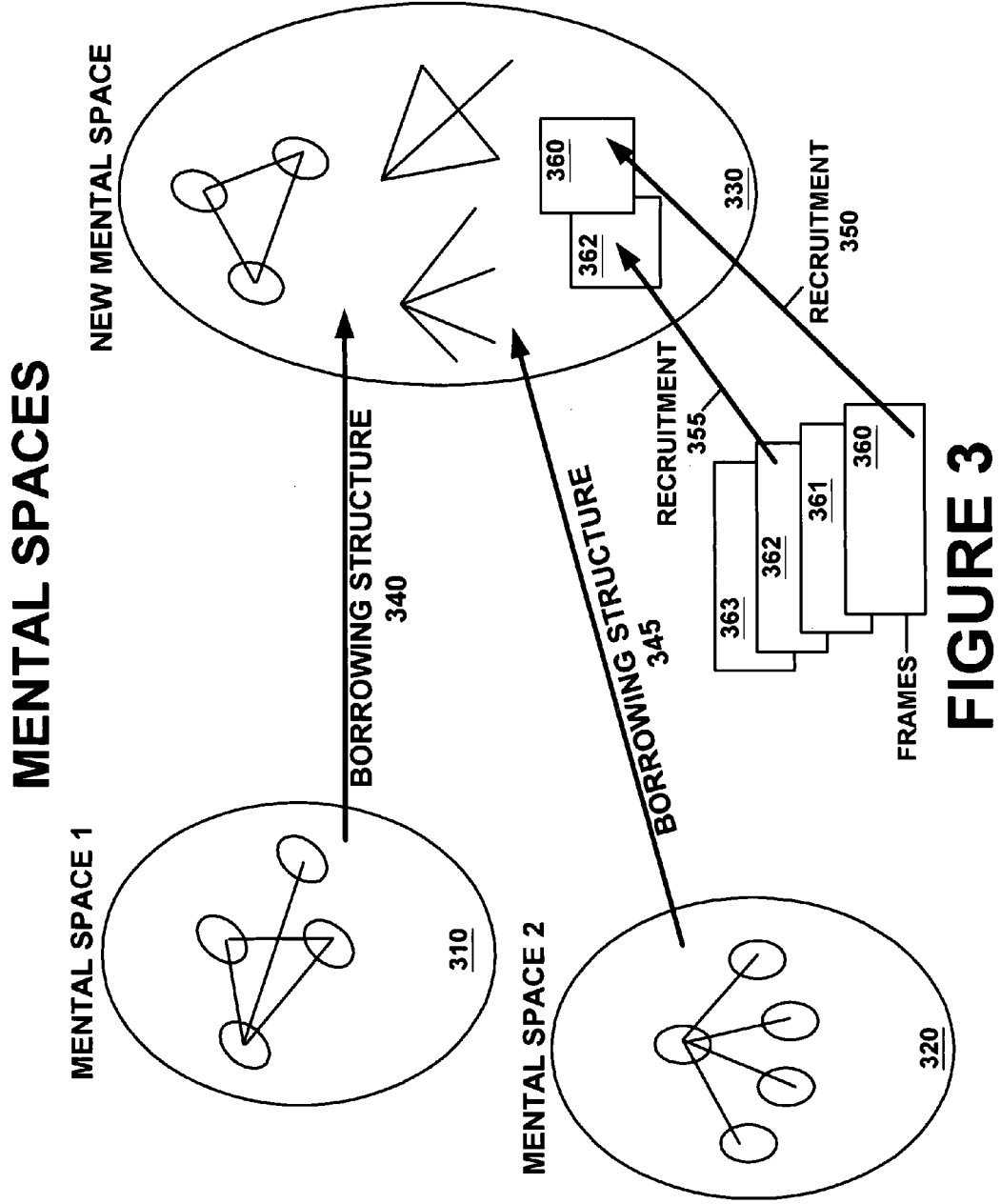
FIG. 3 illustrates numerous mental spaces in accordance with an embodiment of the present invention, showing creation of a new mental space by recruiting frames and borrowing structure from other mental spaces.

FIG. 3 illustrates numerous mental spaces 310, 320, and 330 in accordance with an embodiment of the present invention, showing creation of a new mental space 330 by recruiting frames 360 and 362 and borrowing descriptive structure from other mental spaces 310 and 320. In particular, the mapping 340 indicates that new mental space 330 borrows descriptive structure from mental space1 310. The mapping 345 indicates that new mental space 330 borrows descriptive structure from mental space2 320. Moreover, the recruitment arrow 355 indicates that the new mental space 330 recruits the frame 362 from the set of frames 360-363.

In addition, the recruitment arrow 350 indicates that the new mental space 330 recruits the frame 360 from the set of frames 360-363.

FIG. 4 illustrates numerous mental spaces 410-440 in accordance with an embodiment of the present invention, showing creation of a blend mental space 440 by integrating or blending input mental space1 420 and input mental space2 430. The generic mental space 410 has structures that are found in both the input mental space1 420 and input mental space2 430. The blend mental space 440 integrates borrowed descriptive structures from the input mental space1 420 and input mental space2 430 to form new structures.

Thus, the structure required to represent the complex nature of semantic description for content data may need to be as complex. At first glance, one might be tempted to limit the structure in some way, so that the semantic description would be less complex. Necessarily, this is done at the price of decreasing the type of semantic descriptions that can be constructed, and it may not be obvious how. For instance, the mapping which projects structure from one mental space to another mental space is properly known as metaphor, or analogy. One is tempted to throw this out, given that one only wants a semantic description of content data (e.g., audiovisual material). However, metaphors are used daily without realization of its use. The expression "getting close to the deadline", borrows spatial structure to talk about time. In a world where this has been formalized in mathematics and physics, it may not seem to be an analogy, but it is. It is also quite imperceptible. The point is that unless all semantic descriptions for content data are to be written out in formal well formed propositions, or a language which properly restricts them is to be created, it would be difficult, if not impossible, and quite possibly undesirable to restrict semantic descriptions for content data as advocated by those proposing the specific, static semantic description schemes.

In reviewing the semantic entity tools 210 in FIG. 2, the importance of structure is evident. Semantic objects 211 are descriptions of real objects, or of composites or abstractions of these real objects. They contain semantic states 212. Semantic objects 211 may have semantic subobjects. The semantic states 212 may have semantic substates. Semantic states 212 are collections of attributes. Semantic states 212 may be attached to semantic objects 211, relationships (which are either relations 221 or morphisms/mappings 222), and semantic episodes 214. By extension, they may be attribute collections of mental spaces 216. Semantic states 212 may have semantic substates. Semantic events 213 are changes in semantic states 212. As such, a semantic event 213 may be a change in any of the constituents of a description of a semantic object 211, a semantic episode 214, or a relationship (including what represents the mental spaces 216). Since semantic states 212 may have semantic substates, semantic events 213 may have semantic subevents.

Continuing with FIG. 2, semantic episodes 214 are semantically significant time spans. They may coincide with the behavior of semantic objects 211, with the occurrence of semantic events 213, with changes in relationships, or changes in the mental spaces 216 used to provide context to the semantic objects 211, semantic events 213, and relationships. If semantically significant time spans are properly contained in a semantic episode 214, these semantically significant time spans are semantic subepisodes. Frames 215 are preassumed or predefined sets of rules for interpreting or describing a set of semantic objects 211. As such, they may be prototypical descriptions themselves, or they may be sets of rules, definitions, and descriptive structures 217. Descriptive structures 217 are abstractions of semantic objects 211, semantic episodes 214, semantic states 212, and relationships to graphs 223, with or without extra properties. Mental spaces 216 are collections of semantic objects 211, relationships (which are either relations 221 or morphisms/mappings 222), and frames 215, together with mappings which embed descriptive structures 217 from semantic descriptions or from other mental spaces.

Furthermore, the principles of category theory were examined to determine whether categorical structures (structures observing the principles of category theory) could provide sufficient flexible structure to create any type or kind of semantic description for content data. This examination revealed that the semantic entity tools 210 could be mapped onto categorical structures such as a graph 223. Hence, categorical structure tools 220 such as a category 224, a graph 223, a functor 225, and a natural transformation 226 were needed to create any type or kind of semantic description for content data.

As is evident from the discussion above, a semantic description of content data (e.g., audiovisual material) is therefore characterized by structure. The relationships between semantic objects 211 form structure. The mapping of semantic objects 211, semantic states 212, and semantic events 213 into a semantic episode 214 is structure. The mappings that make up the underlying mental spaces 216 are structure. It is possible to represent semantic states 212 as maps from the entities they describe to spaces of attribute values.

Figure 5A:
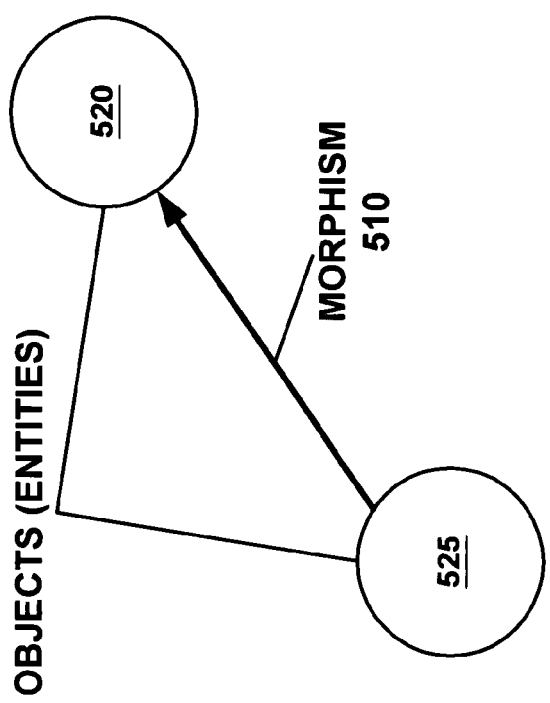
FIG. 5A illustrates a morphism in accordance with an embodiment of the present invention.

As shown in FIG. 2, the categorical structure tools 220 take many forms. Morphisms 222 are directed arrows between mathematical objects or entities. The above identified relationships between semantic objects 211, semantic states 212, and semantic episodes 214 have been described by maps such as these (morphisms). FIG. 5A illustrates a morphism 510 in accordance with an embodiment of the present invention. The morphism 510 is a directed arrow from entity 525 to entity 520. Any of the entities 520 and 525 can be a semantic object 211, a semantic event 213, a relationship, a semantic states 212, a semantic episode 214, a frame 215, a descriptive structure 217, a mental space 216, or any other entity.

Figure 5B:
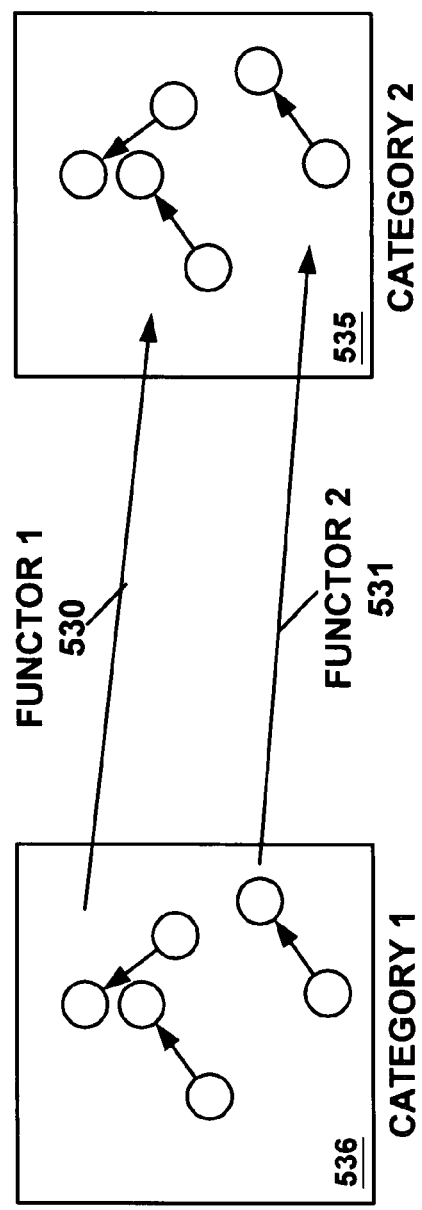
FIG. 5B illustrates a first functor, a second functor, a first category, and a second category in accordance with an embodiment of the present invention.
Figure 5C:
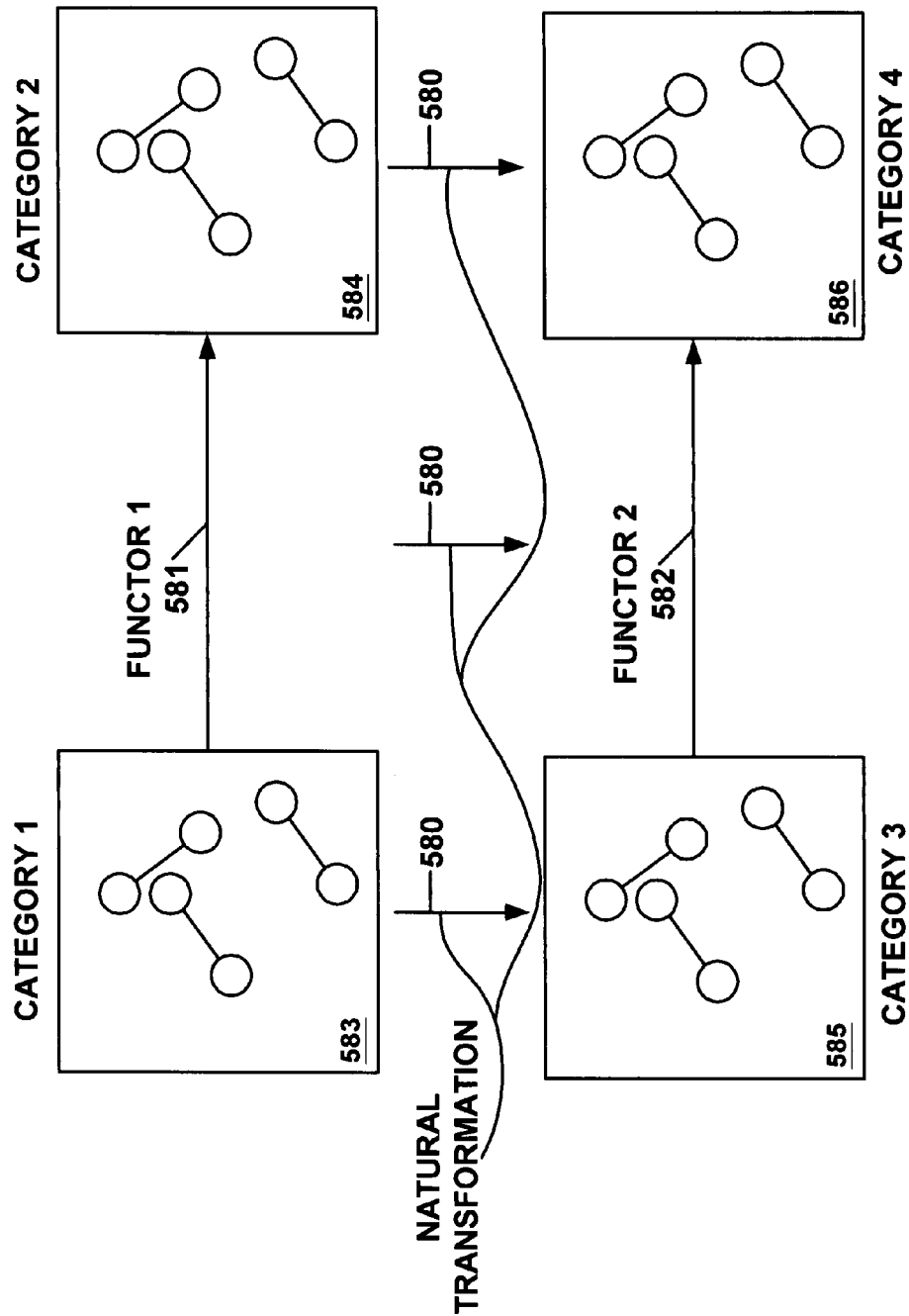
FIG. 5C illustrates a natural transformation in accordance with an embodiment of the present invention.
Figure 5D:
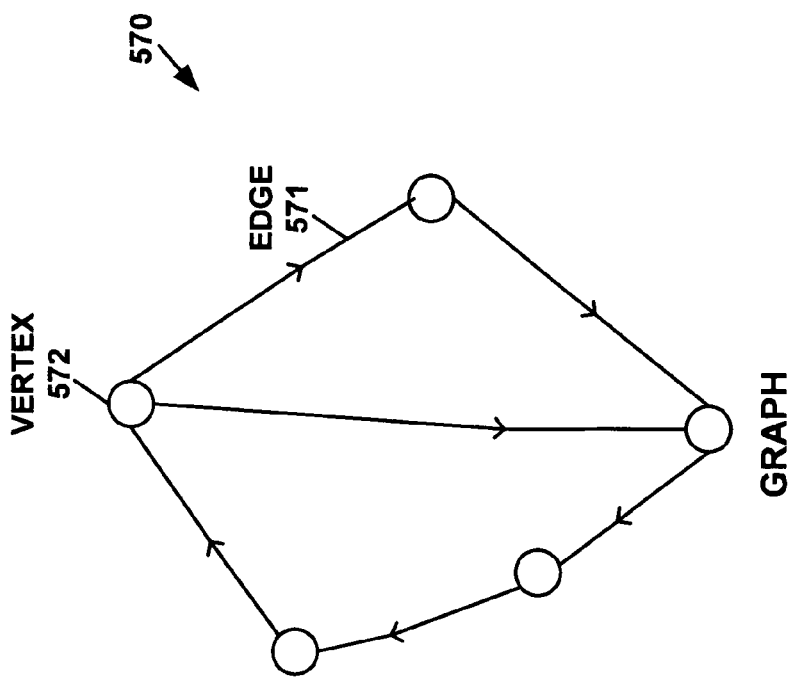
FIG. 5D illustrates a graph in accordance with an embodiment of the present invention.
Figure 5E:
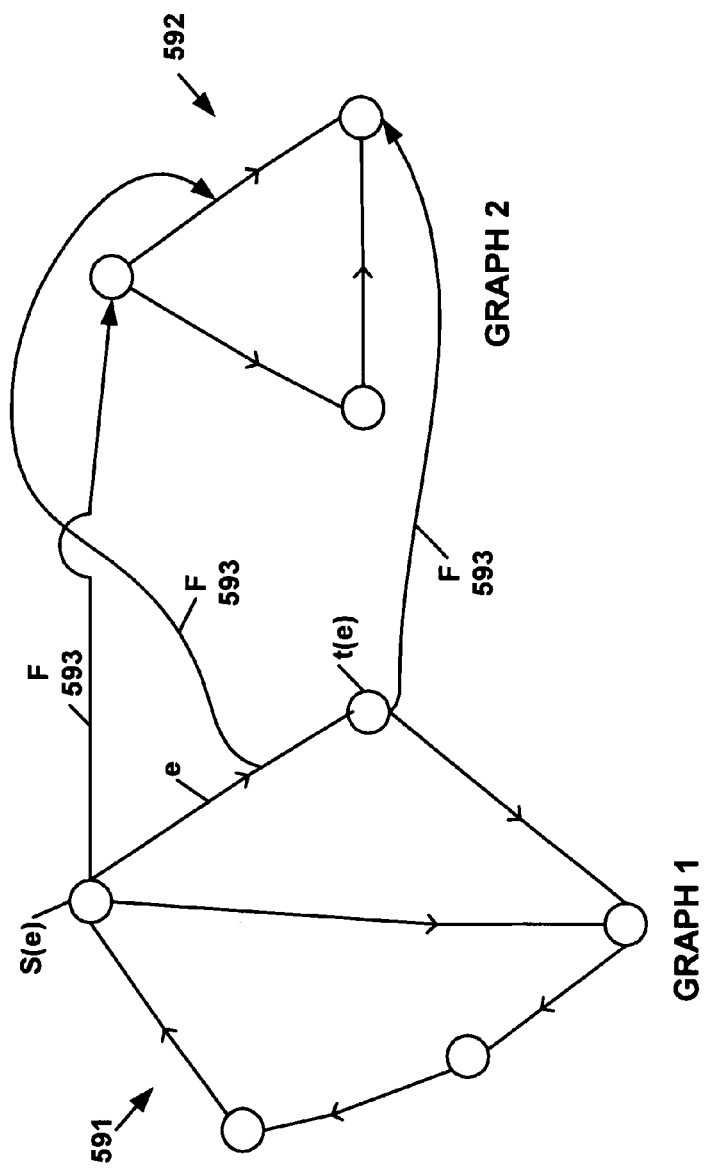
FIG. 5E illustrates a graph morphism in accordance with an embodiment of the present invention.

With reference to FIG. 2, a graph 223 has a set of morphisms between mathematical objects and a set of mathematical objects, with the morphisms as edges and the mathematical objects as vertices or nodes. FIG. 5D illustrates a graph 570 in accordance with an embodiment of the present invention, showing the edges 571 and the nodes 572. FIG. 5E illustrates a graph morphism 593 (F) between graph1 591 and graph2 592 in accordance with an embodiment of the present invention. As illustrated in FIG. 5E, the graph morphism 593 (F) is a pair of mappings: a mapping of an edge e between two nodes s(e) and t(e) and a mapping of the two nodes s(e) and t(e). Moreover, the graph morphism 593 (F) has the property that $s(F(e))=F(s(e))$ and $t(F(e))=F(t(e))$. The equation $s(F(e))=F(s(e))$ indicates that the mapping of node s(e) after performing a graph morphism F on the edge e (i.e. F(e)) is equivalent to the mapping of the node s(e) after performing a graph morphism F on the node s(e) of edge e (i.e., F(s(e))). The equation $t(F(e))=F(t(e))$ indicates that the mapping of node t(e) after performing a graph morphism F on the edge e (i.e. F(e)) is equivalent to the mapping of the node t(e) after performing a graph morphism F on the node t(e) of edge e (i.e., F(t(e))).

Referring to FIG. 2, when graphs 223 obey categorical constraints (i.e., they respect identity and composition on the mathematical objects), the graphs 223 are categories 224. Graphs 223 can also be regarded as mathematical objects in their own right (i.e., making mathematical objects out of maps). This was done above when a change in the semantic state 212 of a relationship was allowed to be a semantic event 213.

With reference to FIG. 2 again, when the morphisms 222 between categories 224 obey categorical constraints (i.e., the identity maps to the identity, the morphisms respect composition), the morphisms 222 are called functors 225. FIG. 5B illustrates a first functor 530, a second functor 531, a first category 536, and a second category 535 in accordance with an embodiment of the present invention. The functor1 530 and the functor2 531 are directed from the category1 536 to the category2 535.

In FIG. 2, if the functors 225 map according to categorical constraints, the functors 225 are called natural transformations 226. Regarding functors 225 as objects and natural transformations 226 as morphisms 222 produces a category 224, allowing use of the categorical structures tools 220 described above. FIG. 5C illustrates a natural transformation 580 in accordance with an embodiment of the present invention. The functor1 581 is directed from the category1 583 to the category2 584. The functor2 582 is directed from the category3 585 to the category4 586. The natural transformation 580 is directed from functor1 581 to functor2 582.

With reference to FIG. 2 again, a map from part of a semantic description into a semantic description is defined. This can be done by relying on a characteristic function 227 to the part of the semantic description in question, composed with a map to the target mental space 216. All of this is categorical structure. Moreover, the spaces from which structure is generated are required to have such characteristic functions 227. In addition, a large number of relationships are required. Lastly, it is possible to form product spaces in which to create these relationships. In sum, the categorical structures described above enable creation of any type or kind of semantic description for content data.

Semantic Mosaic Description

In an embodiment of the present invention, the semantic entity tools 210 (FIG. 2) and the categorical structure tools 220 (FIG. 2) facilitate creation of a semantic mosaic description for content data. The semantic mosaic description is formed from multiple semantic descriptions. These semantic descriptions are integrated with each other such that each semantic description is modified at a local level within localized regions without substantially changing each semantic description outside these localized regions. In particular, the semantic mosaic description facilitates navigation or browsing through the multiple semantic descriptions and the content data.

Figure 6:
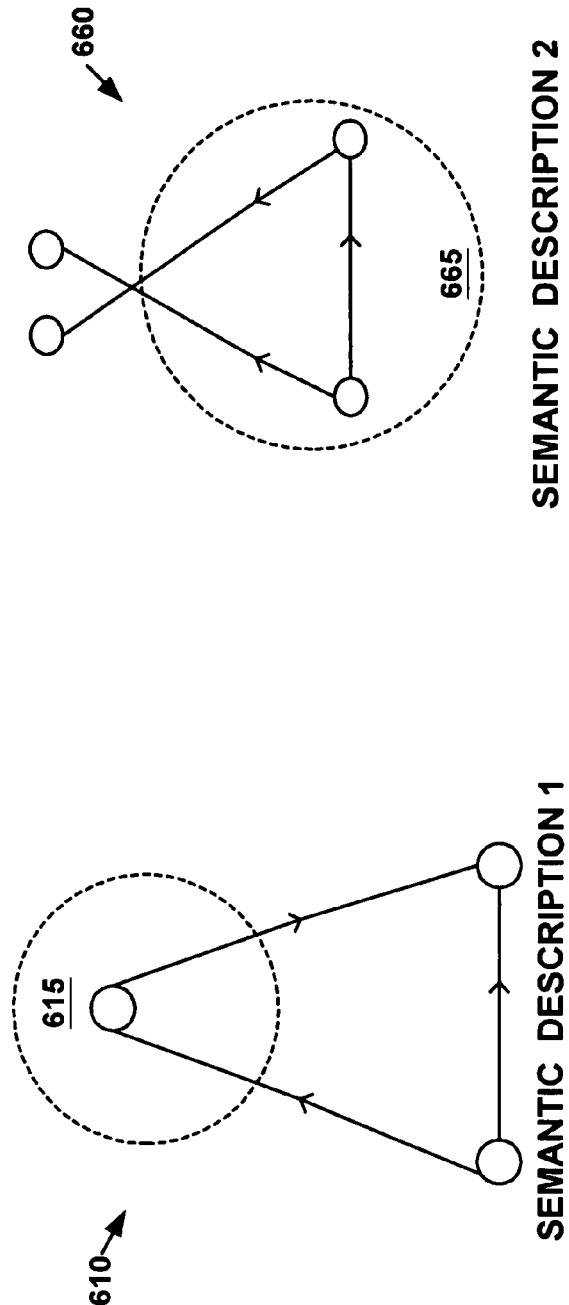
FIG. 6 illustrates a semantic descriptions and a semantic description2 in accordance with an embodiment of the present invention.

FIG. 6 illustrates a semantic description1 610 and a semantic description2 660 in accordance with an embodiment of the present invention. The semantic description1 610 and the semantic description2 660 were formed using the semantic entity tools 210 (FIG. 2) and the categorical structure tools 220 (FIG. 2). By integrating or blending (as described with respect to mental spaces in FIG. 4) the localized region 615 of the semantic description1 610 and the localized region 665 of the semantic description2 660, a semantic mosaic description is formed from the semantic description1 610 and the semantic description2 660. More importantly, the semantic description1 610 and the semantic description2 660 are not substantially changed outside of the localized regions 615 and 665 when they form the semantic mosaic description. It should be understood that any number of semantic descriptions can be integrated into a semantic mosaic description.

Figure 7:
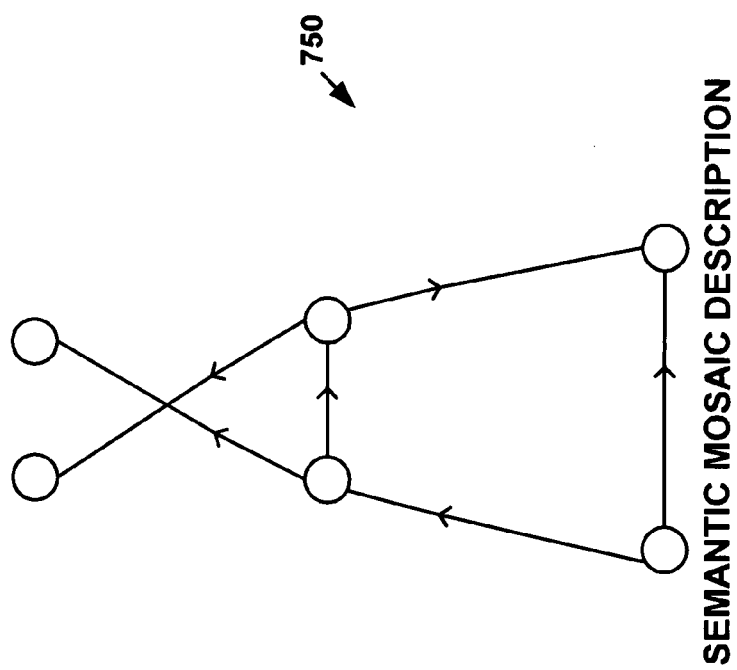
FIG. 7 illustrates a semantic mosaic description based on the semantic descriptions of FIG. 6 and the semantic descriptions of FIG. 6.

FIG. 7 illustrates a semantic mosaic description 750 based on the semantic description1 610 of FIG. 6 and the semantic description2 of FIG. 6. The semantic mosaic description 750 provides several benefits. First, the semantic mosaic description 750 enables additional semantic information to be added to a semantic description where necessary or needed without affecting the entire semantic description. Moreover, the semantic mosaic description 750 can represent a complete semantic description which is formed from multiple partial semantic descriptions. Additionally, the semantic mosaic description can facilitate navigating or browsing through the semantic descriptions 610 and 660 as is done with content data such as audio-visual material. If the localized regions 615 and 665 (FIG. 6) have common elements, the transitions within the semantic mosaic description 750 are smooth. More importantly, as a whole the semantic mosaic description 750 may or may not semantically describe something, but within regions of the semantic mosaic description 750, something is semantically described.

Distributed Semantic Description

In an embodiment of the present invention, the semantic entity tools 210 (FIG. 2) and the categorical structure tools 220 (FIG. 2) facilitate creation of a semantic description for content data using multiple component semantic descriptions stored remotely from the content data. Reference information can be associated with the content data, whereas the reference information includes the identity of the component semantic descriptions needed to form the semantic description, the location of these component semantic descriptions, and the manner of processing these component semantic descriptions to form the semantic description. When the semantic description is desired, the component semantic descriptions identified in the reference information are retrieved (e.g., from a location on a network, a control dictionary, etc.). Then, the semantic description is formed in the manner specified in the reference information using the component semantic descriptions. Thus, the semantic description does not have to be stored in a discrete location, saving storage resources and promoting re-use of component semantic descriptions.

Figure 8:
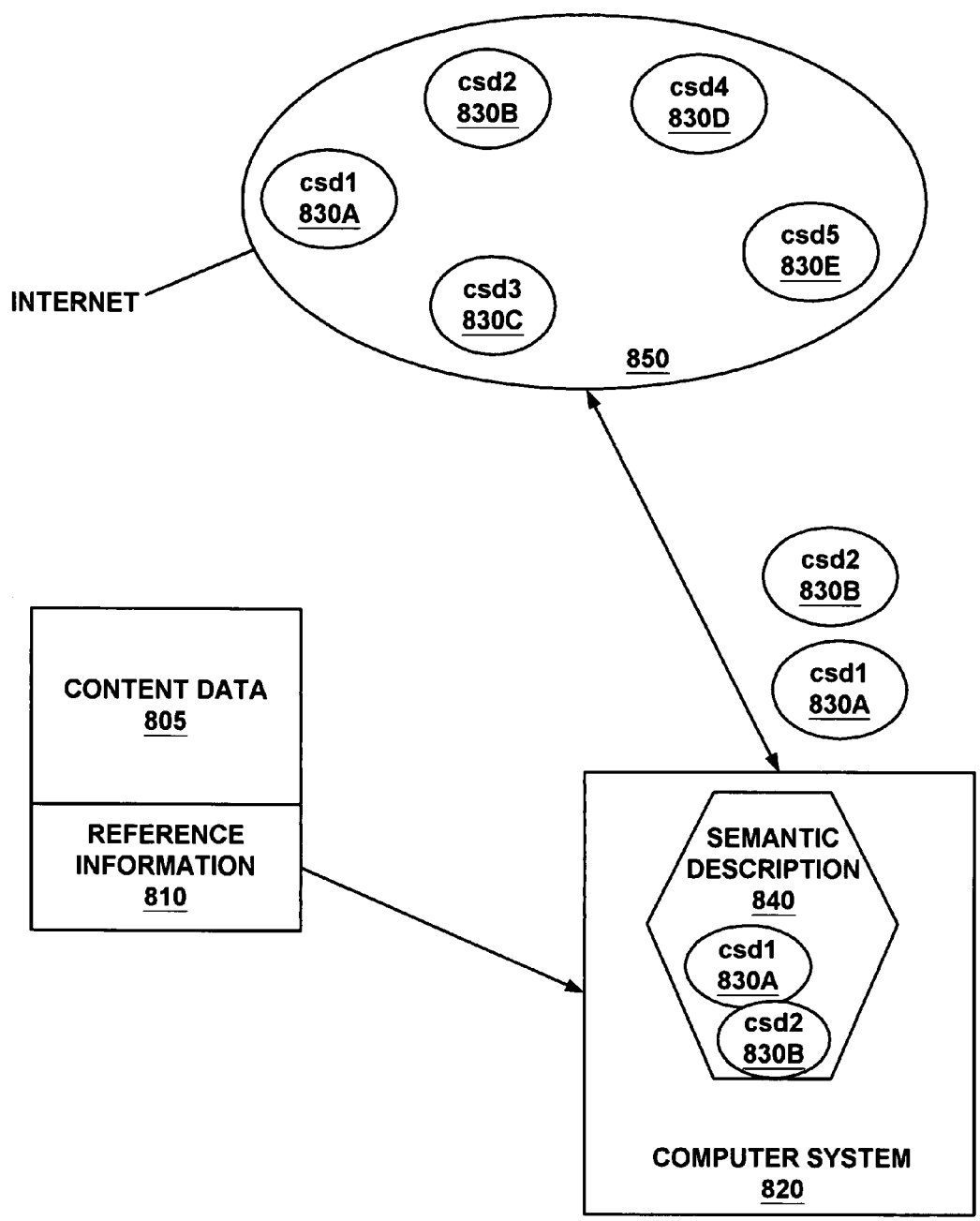
FIG. 8 illustrates formation of a semantic description for content data using multiple component semantic descriptions stored in locations on a network in accordance with an embodiment of the present invention.

FIG. 8 illustrates formation of a semantic description 840 for content data 805 using multiple component semantic descriptions stored in locations on a network 850 in accordance with an embodiment of the present invention. As illustrated in FIG. 8, a plurality of component semantic descriptions 830A-830E are distributively stored in a plurality of locations on a network 850. In particular, the plurality of component semantic descriptions 830A-830E are stored remotely from the content data 805. The network 850 can be the Internet 850 or any other type of network. A semantic description 840 is formed from copies of one or more of the component semantic descriptions 830A-830B.

A complicated semantic description can be formed quickly and easily by referencing, adding new semantic information to, modifying, combining, or extracting partial semantic descriptions from the component semantic descriptions 830A-830E. For example, the semantic description for an elaborate wedding can be formed by using the distributively stored component semantic descriptions of a basic wedding, a fancy wedding gown, a stretch limousine, an expensive wedding cake, etc. These component semantic descriptions are modified and combined to form the semantic description for the elaborate wedding. Additionally, partial semantic descriptions can be extracted from the component semantic descriptions and then combined and/or modified with other component semantic descriptions. Moreover, the semantic description 840 can be generated when needed, reducing the demand for storage resources and encouraging re-use of component semantic descriptions 830A-830E.

Re-use of component semantic descriptions 830A-830E leads to standardization of semantic descriptions. Thus, applications such as the MPEG-7 standard are better able to handle and process the semantic descriptions.

In FIG. 8, the content data 805 includes reference information 810. The computer system 820 or any other computational system such as a MPEG-7 device utilizes the reference information 810 to generate the semantic description 840 for the content data 805. In particular, the reference information 810 includes the identity of the component semantic descriptions 830A-830B needed to form the semantic description 840, the location of these component semantic descriptions 830A-830B, and the manner of processing these component semantic descriptions 830A-830B to form the semantic description 840. It should be understood that the reference information 810 can have any other type of information.

Since the plurality of component semantic descriptions 830A-830E are distributively stored in a plurality of locations on a network 850, each component semantic description 830A-830E is assigned a uniform resource identifier (URI) to facilitate access to the component semantic descriptions 830A-830E. In practice, the reference information 810 has the URI for the component semantic descriptions 830A-830E needed to form the semantic description 840. The computer system 820 or any other computational system such as a MPEG-7 device utilizes the URI(s) to retrieve the corresponding component semantic descriptions 830A-830B, as illustrated in FIG. 8.

In an embodiment, each component semantic description 830A-830E has information pertaining to its use. This information can indicate whether the component semantic description can be subsumed (i.e., can be embedded in another semantic description without changing its intended meaning). Moreover, this information can indicate whether the component semantic description can be subdivided (i.e., admits subdivisions which make the extraction of subsets of its semantic information natural). In addition, this information can indicate whether the component semantic description can be transformed. Furthermore, this information can indicate whether the component semantic description is transitive (i.e., functions as a subset if embedded in another semantic description).

Figure 9:
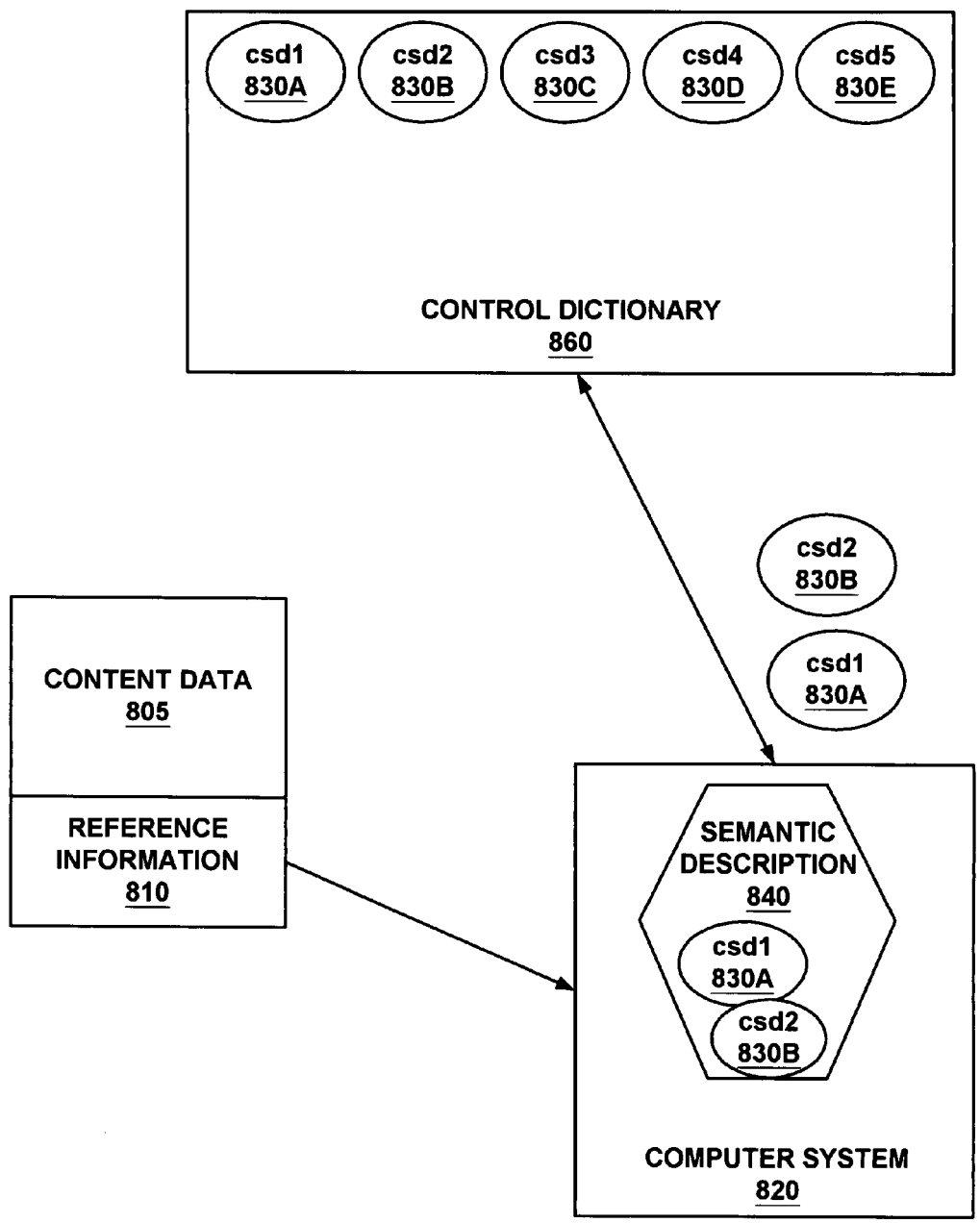
FIG. 9 illustrates formation of a semantic description for content data using multiple component semantic descriptions stored in a control dictionary in accordance with an embodiment of the present invention.

FIG. 9 illustrates formation of a semantic description 840 for content data 805 using multiple component semantic descriptions stored in a control dictionary 860 in accordance with an embodiment of the present invention. The discussion of FIG. 8 is applicable to FIG. 9. Moreover, the plurality of component semantic descriptions 830A-830E are distributively stored in a control dictionary 860 rather than in a plurality of locations on a network. For example, semantic descriptions pertaining to mathematics can be generated from component semantic descriptions retrieved from a control dictionary 860 emphasizing mathematical terms. An index value associated with the control dictionary 860 can be utilized to access the component semantic descriptions stored in the control dictionary 860. It is possible to have a plurality of control dictionaries and different types of control dictionaries.

Figure 10:
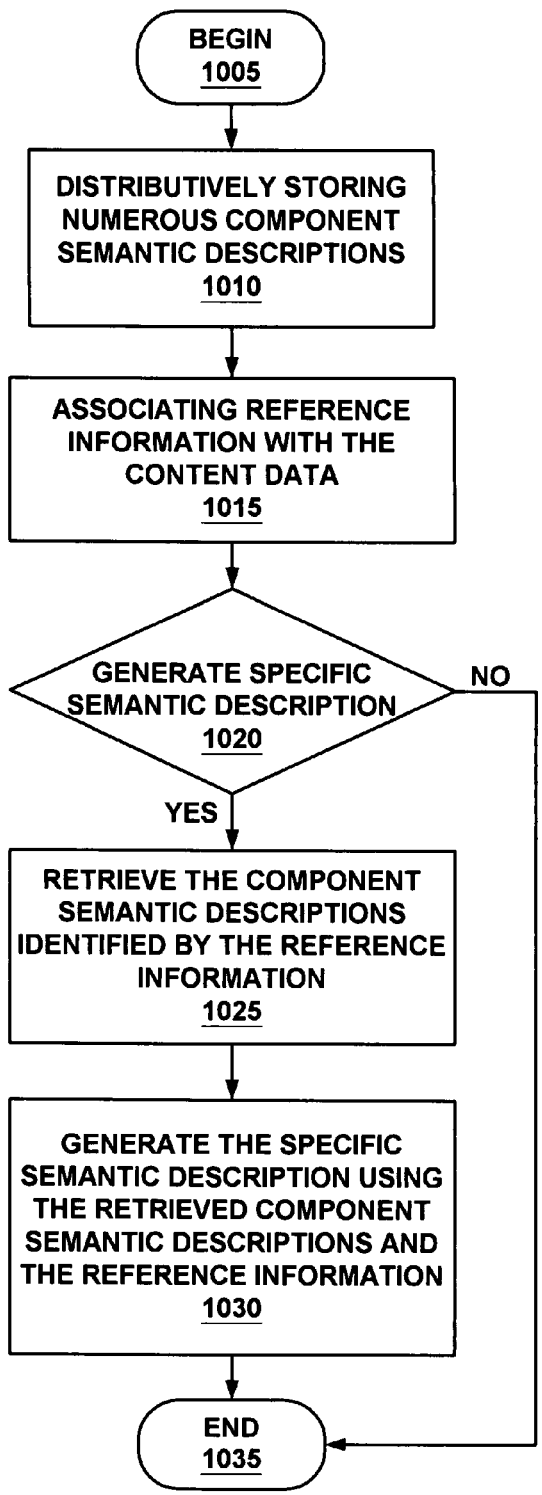
FIG. 10 illustrates a flow chart showing a method of forming a semantic description for content data using multiple component semantic descriptions stored remotely from the content data in accordance with an embodiment of the present invention.

FIG. 10 illustrates a flow chart showing a method 1000 of forming a semantic description for content data using multiple component semantic descriptions stored remotely from the content data in accordance with an embodiment of the present invention. Reference is made to FIGS. 8 and 9.

At step 1005, the method 1000 in accordance with an embodiment of the present invention begins.

Continuing at step 1010, numerous component semantic descriptions 830A-830E are distributively stored. Specifically, the numerous component semantic descriptions 830A-830E are stored remotely from the content data. The component semantic descriptions 830A-830E can be stored in locations on a network 850. Alternatively, the component semantic descriptions 830A-830E can be stored in one or more control dictionaries 860. In addition, the component semantic descriptions 830A-830E can have generic semantic information or specific semantic information.

Furthermore at step 1015, reference information 810 (configured as described above) is associated with the content data 805. This association can take place in a real-time environment or in a non real-time environment, whereas a real-time environment means that the reference information 810 is generated at the same time as the content data 805 is being captured.

At step 1020, it is determined whether to generate the specific semantic description 840 from one or more component semantic descriptions 830A-830E. For example, the computer system 820 or any other computational system such as a MPEG-7 device may receive a request for the specific semantic description 840 for the content data 805 in order to display, search, index, filter, or otherwise process the content data 805. At step 1035, the method 1000 ends if the specific semantic description 840 is not needed.

Otherwise, at step 1025, the computer system 820 or any other computational system such as a MPEG-7 device retrieves the component semantic descriptions 830A-830B identified by the reference information 810 from a network 850 or from a control dictionary 860.

At step 1030, the computer system 820 or any other computational system such as a MPEG-7 device generates the specific semantic description 840 using the retrieved component semantic descriptions 830A-830B and the reference information 810 which indicates the manner of processing these component semantic descriptions 830A-830B to form the specific semantic description 840. In particular, the reference information 810 indicates the manner of referencing, adding new semantic information to, modifying, combining, or extracting partial semantic descriptions from the component semantic descriptions 830A-830B.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of representing a semantic description for content data, comprising the steps of:
   a) using a core semantic entity for expressing an underlying meaning of said content data instead of expressing what is in said content data to represent said semantic description, wherein said content data comprises one of picture, graphics, 3D model, audio, video, and any combination thereof, wherein said core semantic entity comprises a semantic object which semantically describes an object and which includes a plurality of attributes associated with said object, wherein said semantic object comprises semantic sub-objects, a semantic state which is a collection of attributes of said semantic object, wherein said semantic state comprises semantic sub-states, a semantic event which is a change in said semantic state, wherein said semantic event comprises semantic sub-events, and a semantic episode which represents semantic events over a period of time, wherein said semantic episode comprises semantic sub-episodes;
   b) using a constructed semantic entity having at least one core semantic entity to represent said semantic description, wherein said constructed semantic entity expresses an underlying meaning of said content data instead of expressing what is in said content data, wherein said constructed semantic entity has a plurality of operational properties resembling cognitive operations;
   c) using a categorical structure to represent said semantic description, wherein said categorical structure comprises a morphism being a mapping between entities, a graph including a set of morphisms between entities where said morphisms are implemented as edges and a set of entities where said entities are implemented as vertices, a category including a plurality of entities and at least one morphism between said entities, a functor being a mapping between categories and obeys a plurality of categorical constraints, a natural transformation being a mapping between functors and obeys said plurality of categorical constraints, and a relation; and
   d) storing said semantic description, wherein said semantic description describes an underlying meaning of said content data instead of describing what is in said content data.

2. A method as recited in claim 1 further comprising the steps of:
   using a context semantic entity to represent said semantic description.

3. A method as recited in claim 2 wherein said context semantic entity comprises a frame.

4. A method as recited in claim 1 wherein said constructed semantic entity comprises a mental space.

5. A method as recited in claim 1 wherein said constructed semantic entity comprises a descriptive structure.

6. A method of representing a semantic description for content data, comprising the steps of:
   a) using a core semantic entity to represent said semantic description, wherein said content data comprises one of picture, graphics, 3D model, audio, video, and any combination thereof, wherein said core semantic entity comprises a semantic object which semantically describes an object and which includes a plurality of attributes associated with said object, a semantic state which is a collection of attributes of said semantic object, a semantic event which is a change in said semantic state, and a semantic episode which represents semantic events over a period of time;

b) using a categorical structure to represent said semantic description, wherein said categorical structure comprises a morphism being a mapping between entities, a graph including a set of morphisms between entities where said morphisms are implemented as edges and a set of entities where said entities are implemented as vertices, a category including a plurality of entities and at least one morphism between said entities, a functor being a mapping between categories and obeys a plurality of categorical constraints, a natural transformation being a mapping between functors and obeys said plurality of categorical constraints, and a relation; and c) storing said semantic description.

7. A method as recited in claim 6 further comprising the steps of:

using a constructed semantic entity having at least one core semantic entity to represent said semantic description, wherein said constructed semantic entity has a plurality of operational properties resembling cognitive operations.

8. A method as recited in claim 7 further comprising the steps of:

using a context semantic entity to represent said semantic description.

9. A method as recited in claim 8 wherein said context semantic entity comprises a frame.

10. A method as recited in claim 7 wherein said constructed semantic entity comprises a mental space.

11. A method as recited in claim 7 wherein said constructed semantic entity comprises a descriptive structure.

12. A computer system comprising:

a bus;

a memory device coupled to said bus and having computer-executable instructions; and a processor coupled to said bus, wherein said processor executes said computer executable instructions to use a core semantic entity for expressing an underlying meaning of content data instead of expressing what is in said content data to represent a semantic description for said content data, wherein said content data comprises one of picture, graphics, 3D model, audio, video, and any combination thereof, wherein said core semantic entity comprises a semantic object which semantically describes an object and which includes a plurality of attributes associated with said object, wherein said semantic object comprises semantic sub-objects, a semantic state which is a collection of attributes of said semantic object, wherein said semantic state comprises semantic sub-states, a semantic event which is a change in said semantic state, wherein said semantic event comprises semantic sub-events, and a semantic episode which represents semantic events over a period of time, wherein said semantic episode comprises semantic sub-episodes, wherein said processor executes said computer executable instructions to use a constructed semantic entity having at least one core semantic entity to represent said semantic description, wherein said constructed semantic entity expresses an underlying meaning of said content data instead of expressing what is in said content data, wherein said constructed semantic entity has a plurality of operational properties resembling cognitive operations, and wherein said processor executes said computer executable instructions to store said semantic description, wherein said semantic description describes an underlying meaning of said content data instead of describing what is in said content data, wherein said processor executes said computer executable instructions to use a categorical structure to represent said semantic description, and wherein said categorical structure comprises a morphism being a mapping between entities, a graph including a set of morphisms between entities where said morphisms are implemented as edges and a set of entities where said entities are implemented as vertices, a category including a plurality of entities and at least one morphism between said entities, a functor being a mapping between categories and obeys a plurality of categorical constraints, a natural transformation being a mapping between functors and obeys said plurality of categorical constraints, and a relation.

13. A computer system as recited in claim 12 wherein said processor executes said computer executable instructions to use a context semantic entity to represent said semantic description.

14. A computer system as recited in claim 13 wherein said context semantic entity comprises a frame.

15. A computer system as recited in claim 12 wherein said constructed semantic entity comprises a mental space.

16. A computer system as recited in claim 12 wherein said constructed semantic entity comprises a descriptive structure.

17. A computer system comprising:

a bus;

a memory device coupled to said bus and having computer-executable instructions; and a processor coupled to said bus, wherein said processor executes said computer executable instructions to use a core semantic entity to represent a semantic description for content data, wherein said core semantic entity comprises a semantic object which semantically describes an object and which includes a plurality of attributes associated with said object, a semantic state which is a collection of attributes of said semantic object, a semantic event which is a change in said semantic state, and a semantic episode which represents semantic events over a period of time, wherein said processor executes said computer executable instructions to use a categorical structure to represent said semantic description for said content data, wherein said categorical structure comprises a morphism being a mapping between entities, a graph including a set of morphisms between entities where said morphisms are implemented as edges and a set of entities where said entities are implemented as vertices, a category including a plurality of entities and at least one morphism between said entities, a functor being a mapping between categories and obeys a plurality of categorical constraints, a natural transformation being a mapping between functors and obeys said plurality of categorical constraints, and a relation, and wherein said processor executes said computer executable instructions to store said semantic description, wherein said content data comprises one of picture, graphics, 3D model, audio, video, and any combination thereof.

18. A computer system as recited in claim 17 wherein said processor executes said computer executable instructions to use a constructed semantic entity having at least one core semantic entity to represent said semantic description, wherein said constructed semantic entity has a plurality of operational properties resembling cognitive operations.

19. A computer system as recited in claim 18 wherein said processor executes said computer executable instructions to use a context semantic entity to represent said semantic description.

20. A computer system as recited in claim 19 wherein said context semantic entity comprises a frame.

21. A computer system as recited in claim 18 wherein said constructed semantic entity comprises a mental space.

22. A computer-readable medium comprising a data structure representing a semantic description for content data, wherein said data structure stored therein comprises
 a core semantic entity for expressing an underlying meaning of said content data instead of expressing what is in said content data to represent said semantic description, wherein said content data comprises one of picture, graphics, 3D model, audio, video, and any combination thereof, wherein said core semantic entity comprises a semantic object which semantically describes an object and which includes a plurality of attributes associated with said object, wherein said semantic object comprises semantic sub-objects, a semantic state which is a collection of attributes of said semantic object, wherein said semantic state comprises semantic sub-states, a semantic event which is a change in said semantic state, wherein said semantic event comprises semantic sub-events, and a semantic episode which represents semantic events over a period of time, wherein said semantic episode comprises semantic sub-episodes;
 a constructed semantic entity having at least one core semantic entity to represent said semantic description, wherein said constructed semantic entity expresses an underlying meaning of said content data instead of expressing what is in said content data, wherein said constructed semantic entity has a plurality of operational properties resembling cognitive operations; and
 a categorical structure to represent said semantic description, wherein said categorical structure comprises a morphism being a mapping between entities, a graph including a set of morphisms between entities where said morphisms are implemented as edges and a set of entities where said entities are implemented as vertices, a category including a plurality of entities and at least one morphism between said entities, a functor being a mapping between categories and obeys a plurality of categorical constraints, a natural transformation being a mapping between functors and obeys said plurality of categorical constraints, and a relation.

23. A computer-readable medium as recited in claim 22 wherein said constructed semantic entity comprises a mental space.

24. A computer-readable medium as recited in claim 22 wherein said data structure further comprises a context semantic entity to represent said semantic description, wherein said context semantic entity comprises a frame.

25. A method of representing a semantic mosaic description for content data, comprising the steps of:
 a) using a plurality of semantic descriptions to represent said semantic mosaic description, wherein each semantic description describes an underlying meaning of respective content data instead of describing what is in said respective content data, wherein said content data comprises one of picture, graphics, 3D model, audio, video, and any combination thereof, wherein each semantic description comprises a semantic object which semantically describes an object and which includes a plurality of attributes associated with said object, wherein said semantic object comprises semantic sub-objects, a semantic state which is a collection of attributes of said semantic object, wherein said semantic state comprises semantic sub-states, a semantic event which is a change in said semantic state, wherein said semantic event comprises semantic sub-events, and a semantic episode which represents semantic events over a period of time, wherein said semantic episode comprises semantic sub-episodes, wherein each semantic description includes a categorical structure comprising a morphism being a mapping between entities, a graph including a set of morphisms between entities where said morphisms are implemented as edges and a set of entities where said entities are implemented as vertices, a category including a plurality of entities and at least one morphism between said entities, a functor being a mapping between categories and obeys a plurality of categorical constraints, a natural transformation being a mapping between functors and obeys said plurality of categorical constraints, and a relation; and
 b) storing said semantic mosaic description.

26. A method as recited in claim 25 wherein said semantic mosaic description facilitates navigation through said content data and said plurality of semantic descriptions.

27. A method as recited in claim 25 wherein said semantic descriptions have common semantic elements.

28. A computer system comprising:
 a bus;
 a memory device coupled to said bus and having computer-executable instructions; and
 a processor coupled to said bus, wherein said processor executes said computer executable instructions to use a plurality of semantic descriptions to represent a semantic mosaic description for content data, wherein each semantic description describes an underlying meaning of respective content data instead of describing what is in said respective content data, wherein said content data comprises one of picture, graphics, 3D model, audio, video, and any combination thereof, wherein each semantic description comprises a semantic object which semantically describes an object and which includes a plurality of attributes associated with said object, wherein said semantic object comprises semantic sub-objects, a semantic state which is a collection of attributes of said semantic object, wherein said semantic state comprises semantic sub-states, a semantic event which is a change in said semantic state, wherein said semantic event comprises semantic sub-events, and a semantic episode which represents semantic events over a period of time, wherein said semantic episode comprises semantic sub-episodes, and wherein said processor executes said computer executable instructions to store said semantic mosaic description, wherein each semantic description includes a categorical structure comprising a morphism being a mapping between entities, a graph including a set of morphisms between entities where said morphisms are implemented as edges and a set of entities where said entities are implemented as vertices, a category including a plurality of entities and at least one morphism between said entities, a functor being a mapping between categories and obeys a plurality of categorical constraints, a natural transformation being a mapping between functors and obeys said plurality of categorical constraints, and a relation.

29. A computer system as recited in claim 28 wherein said semantic mosaic description facilitates navigation through said content data and said plurality of semantic descriptions.

30. A computer system as recited in claim 28 wherein said semantic descriptions have common semantic elements.

31. A computer-readable medium comprising a data structure representing a semantic mosaic description for content data, wherein said data structure stored therein comprises
a plurality of semantic descriptions, wherein each semantic description describes an underlying meaning of respective content data instead of describing what is in said respective content data, wherein said content data comprises one of picture, graphics, 3D model, audio, video, and any combination thereof, wherein each semantic description comprises a semantic object which semantically describes an object and which includes a plurality of attributes associated with said object, wherein said semantic object comprises semantic sub-objects, a semantic state which is a collection of attributes of said semantic object, wherein said semantic state comprises semantic sub-states, a semantic event which is a change in said semantic state, wherein said semantic event comprises semantic sub-events, and a semantic episode which represents semantic events over a period of time, wherein said semantic episode comprises semantic sub-episodes, wherein each semantic description includes a categorical structure comprising a morphism being a mapping between entities, a graph including a set of morphisms between entities where said morphisms are implemented as edges and a set of entities where said entities are implemented as vertices, a category including a plurality of entities and at least one morphism between said entities, a functor being a mapping between categories and obeys a plurality of categorical constraints, a natural transformation being a mapping between functors and obeys said plurality of categorical constraints, and a relation.

32. A computer-readable medium as recited in claim 31 wherein said semantic mosaic description facilitates navigation through said content data and said plurality of semantic descriptions.

33. A computer-readable medium as recited in claim 31 wherein said semantic descriptions have common semantic elements.

* * * * *